E. MATHER.
Spittoons.

No. 135,234.  Patented Jan. 28, 1873.

UNITED STATES PATENT OFFICE.

EMMETT MATHER, OF CHICAGO, ILLINOIS, ASSIGNOR TO FRANK STURGES & CO., OF SAME PLACE.

IMPROVEMENT IN SPITTOONS.

Specification forming part of Letters Patent No. 135,234, dated January 28, 1873.

*To all whom it may concern:*

Be it known that I, EMMETT MATHER, of Chicago, in the county of Cook and State of Illinois, have invented certain new and useful Improvements in Spittoon, of which the following is a full, clear, and exact description, which will enable others skilled in the art to which my invention appertains to make the same, reference being had to the accompanying drawing forming a part of this specification, and in which—

Figure 1:
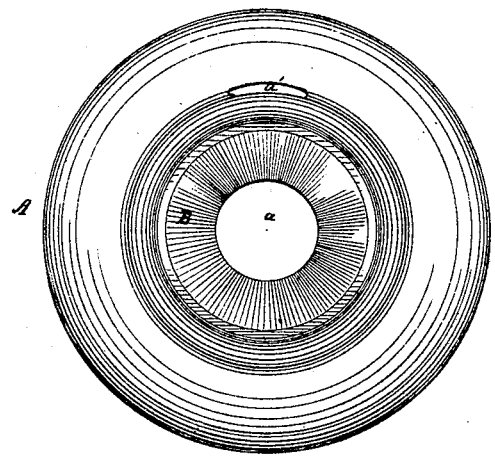
Figure 2:
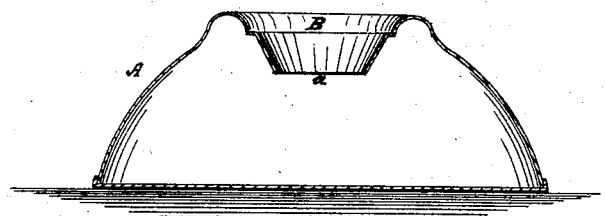

Figure 1 represents a top view of my improved spittoon, and Fig. 2 a vertical central section of the same.

My invention relates to that class of spittoons made of sheet metal.

Heretofore spittoons of this class have been made of several pieces, which, with the exception of a removable cover resting on the body of the spittoon without being attached thereto, have been rigidly united so as to prevent leakage.

An objectionable feature of a spittoon having such a cover is, that slight blows accidentally given to the spittoon frequently result in jarring the cover from its position, and in either spilling the contents, or exposing them to view.

The object of my invention is to prevent the accidental removal of the cover; and to that end it consists in making (as a new article of manufacture) the body of the spittoon and the cover in one continous piece, attached to a bottom piece in any suitable manner which will prevent leakage.

In the drawing, A represents the body, and B the cover. These parts are made of one continuous piece of sheet metal, in which are cut the usual receiving and discharging openings, as shown at $a$ and $a'$. The part A B is united to a bottom piece in any suitable manner which will prevent leakage at the junction of these parts.

Having thus described my invention, what I claim as new, and desire to secure by Letters Patent, is—

A new article of manufacture, consisting of a sheet-metal spittoon, the body and cover of which are made in one continuous piece attached to the bottom.

EMMETT MATHER.

Witnesses:
   F. H. BROWN,
   F. F. WARNER.